US008368934B2

(12) United States Patent
Inose

(10) Patent No.: US 8,368,934 B2
(45) Date of Patent: Feb. 5, 2013

(54) IMAGE PROCESSING INCLUDING REGISTERING IMAGE DATA

(75) Inventor: Koji Inose, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 458 days.

(21) Appl. No.: 12/713,124

(22) Filed: Feb. 25, 2010

(65) Prior Publication Data

US 2010/0238492 A1 Sep. 23, 2010

(30) Foreign Application Priority Data

Mar. 17, 2009 (JP) ................................ 2009-065218

(51) Int. Cl.
*G06F 15/00* (2006.01)
*G06F 3/12* (2006.01)
*G06K 1/00* (2006.01)
*G06K 15/00* (2006.01)
(52) U.S. Cl. ...................................... 358/1.15; 358/1.14
(58) Field of Classification Search .................... None
See application file for complete search history.

(56) References Cited

U.S. PATENT DOCUMENTS

| 7,339,694 | B2 | 3/2008 | Inose et al. |
| 2004/0264811 | A1 | 12/2004 | Yano |
| 2008/0148137 | A1* | 6/2008 | Terao et al. .................. 715/200 |

FOREIGN PATENT DOCUMENTS

JP 2005-018374 A 1/2005

\* cited by examiner

*Primary Examiner* — Douglas Tran
(74) *Attorney, Agent, or Firm* — Fitzpatrick, Cella, Harper & Scinto

(57) ABSTRACT

This invention provides an image processing system, which can suppress evidenced document registration by spoofing of a third party upon execution of registration processing of an evidenced document in a server, and a control method thereof. To accomplish this, in an image processing system of this invention, when the user registers an evidenced document in a server as image data, an MFP decides whether or not to register the evidenced document not only by authentication processing based on a user ID and password, but also by determination processing based on a work identifier used to identify a workflow.

12 Claims, 9 Drawing Sheets

| 301 | 302 | 303 | 304 |
|---|---|---|---|
| WORK IDENTIFIER | USER ID | EVIDENCED DOCUMENT IDENTIFIER | SAVING DESTINATION OF IMAGE OF EVIDENCED DOCUMENT |
| WF001 | A | 001 | C:¥path¥image001.jpg |
| WF002 | B | 002 | C:¥path¥image002.jpg |

| 401 | 402 |
|---|---|
| USER ID | USER PASSWORD |
| A | aaa |
| B | bbb |

| WORK IDENTIFIER | WORKFLOW | USER ID | EVIDENCED DOCUMENT IDENTIFIER | SAVING DESTINATION OF IMAGE OF EVIDENCED DOCUMENT |
|---|---|---|---|---|
| WF001 | PRINT | A | 001 | C:¥path¥image001.jpg |
|  | SCAN & REGISTRATION | A |  |  |
| WF002 | XXX | B | 002 | C:¥path¥image002.jpg |

INPUT USER ID AND
PASSWORD DO NOT MATCH

INPUT USER ID AND
READ PASSWORD DO
NOT MATCH

NO WORK NUMBER
MATCHES

IMAGE PROCESSING INCLUDING REGISTERING IMAGE DATA

BACKGROUND OF THE INVENTION

1. Field of the Invention

The present invention relates to an image processing system that registers image data in a storage device, an image processing apparatus, and a control method of the image processing system.

2. Description of the Related Art

As a method of managing evidenced documents such as invoices and receipts, a method of digitizing evidenced documents as paper media and managing their image data using a server is known. Upon registering an evidenced document in a server, in general, an evidenced document of a paper medium is digitized together with a board printed with an evidenced document identifier used to identify the evidenced document, using a scanner, and image data of the digitized evidenced document is registered in the server. The evidenced documents registered in the server to be linked with their evidenced document identifiers are subject to an evidenced document search using an evidenced document identifier.

For example, Japanese Patent Laid-Open No. 2005-018374 has proposed the following method. That is, an encrypted user identifier (user ID) is printed on a board for the purpose of authentication of a user who digitizes an evidenced document and registers it in a server. Furthermore, authentication processing is executed based on a comparison result between the user ID on the board read by a scanner together with the evidenced document, and that input by the user.

However, the aforementioned related art suffers the following problem. For example, upon execution of the authentication processing of the user who registers the evidenced document, authentication is made based on a collation result of the ID printed on the board. However, when the board itself is stolen, it unwantedly allows a third party to easily register the evidenced document.

SUMMARY OF THE INVENTION

The present invention has been made in consideration of the aforementioned problem, and provides an image processing system which suppresses a third party from freely registering a document upon digitizing and registering the document, an image processing apparatus, and a control method of the image processing system.

One aspect of the present invention provides an image processing system that comprises an image processing apparatus and a work management apparatus, the work management apparatus comprising a management unit that manages a document identifier used to identify a document and a user identifier used to identify a user in association with each other; and the image processing apparatus comprising a reading unit that reads a document to generate digital data, a first specifying unit that specifies a document identifier of the document read by the reading unit, an authentication unit that authenticates a user, a second specifying unit that specifies a user identifier of the user authenticated by the authentication unit, and a registration unit that registers the digital data generated by the reading unit, when the management unit manages the document identifier specified by the first specifying unit and the user identifier specified by the second specifying unit in association with each other.

Another aspect of the present invention provides an image processing system that comprises a work management apparatus and an image processing apparatus, the image processing apparatus comprising a reading unit that reads a document to generate digital data, a first specifying unit that specifies a document identifier of the document read by the reading unit, a first transmission unit that transmits the document identifier specified by the first specifying unit to the work management apparatus, an authentication unit that authenticates a user, a second specifying unit that specifies a user identifier of the user authenticated by the authentication unit, and a second transmission unit that transmits the user identifier specified by the second specifying unit to the work management apparatus; and the work management apparatus comprising a management unit that manages a document identifier used to identify a document and a user identifier used to identify a user in association with each other, a first reception unit that receives the document identifier transmitted by the first transmission unit, a second reception unit that receives the user identifier transmitted by the second transmission unit, and a registration unit that registers the digital data generated by the reading unit when the management unit manages the document identifier received by the first reception unit and the user identifier received by the second reception unit in association with each other.

Still another aspect of the present invention provides an image processing apparatus comprising: a management unit that manages a document identifier used to identify a document and a user identifier used to identify a user in association with each other; a reading unit that reads a document to generate digital data; a first specifying unit that specifies a document identifier of a document read by the reading unit; an authentication unit that authenticates a user; a second specifying unit that specifies a user identifier of the user authenticated by the authentication unit; and a registration unit that registers the digital data generated by the reading unit when the management unit manages the document identifier specified by the first specifying unit and the user identifier specified by the second specifying unit in association with each other.

Yet another aspect of the present invention provides a method of controlling an image processing system that comprises a work management apparatus and an image processing apparatus, the method comprising causing the work management apparatus to manage a document identifier used to identify a document and a user identifier used to identify a user in association with each other; and causing the image processing apparatus to read a document to generate digital data, specify a document identifier of the document read in the reading, authenticate a user, specify a user identifier of the user authenticated the authenticating, and register the digital data generated in the reading, when the document identifier specified in the specifying the document identifier and the user identifier specified in the specifying the user identifier are managed in association with each other in the managing.

According to the present invention, for example, registration by a third party can be suppressed upon execution of document registration processing in a storage device.

Further features of the present invention will become apparent from the following description of exemplary embodiments (with reference to the attached drawings).

BRIEF DESCRIPTION OF THE DRAWINGS

FIG. 12 is a view showing a display example on a UI unit when user authentication has failed;

FIG. 13 is a view showing a display example on a UI unit when user authentication has failed; and FIG. 14 is a view showing a display example on a UI unit when work identifiers do not match.

DESCRIPTION OF THE EMBODIMENTS

Embodiments of the present invention will be described hereinafter. Each individual embodiment to be described hereinafter will help understanding of various concepts such as the generic concept, intermediate concept, and subordinate concept of the present invention. Also, the technical scope of the present invention is settled by the scope of the claims, and is not limited to each individual embodiment to be described hereinafter.

First Embodiment

<Arrangement of Image Processing System>

Figure 1:
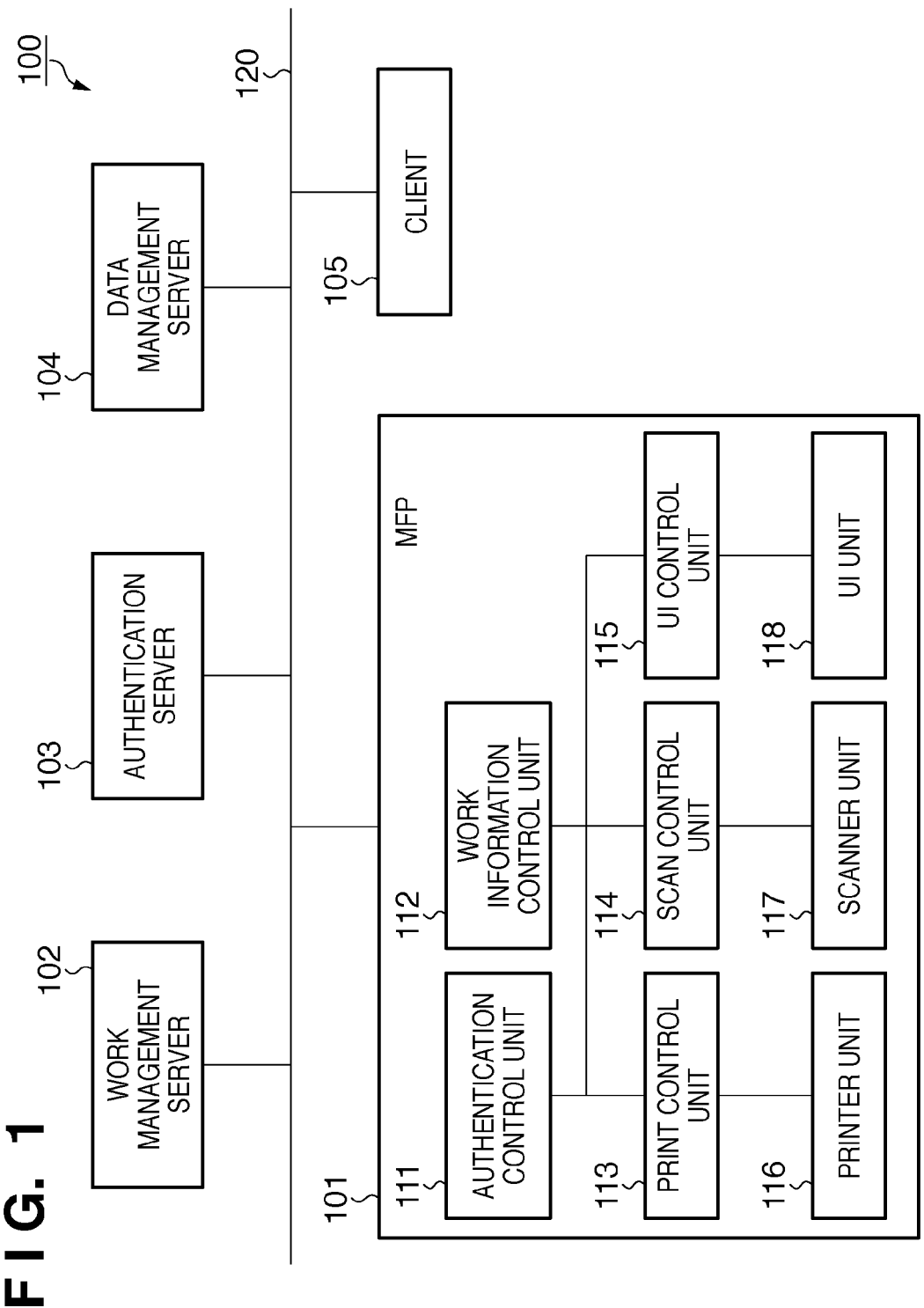
FIG. 1 is a block diagram showing an example of the arrangement of an image processing system according to the first embodiment.

The first embodiment of the present invention will be described hereinafter with reference to FIGS. 1 to 4, and FIGS. 7 and 8. FIG. 1 is a block diagram showing an example of the arrangement of an image processing system according to the first embodiment. An image processing system 100 includes a multi-function peripheral (MFP) 101, work management server 102, authentication server 103, and data management server 104. These apparatuses are connected to each other via a network 120 laid by a LAN (Local Area Network) or WAN (Wide Area Network). To the network 120, a client 105 operated by the user is connected. Note that some of the MFP 101, work management server 102, authentication server 103, and data management server 104 may be equipped in a single housing as a standalone apparatus.

The MFP 101 is an image processing apparatus which can execute print processing, document reading (scan) processing, and the like, and registers digital data (image data) digitized by the scan processing in the data management server 104. The data management server 104 includes a storage device that saves image data received from the MFP 101, and accepts registration of image data. The work management server 102 manages workflows to be executed by the MFP 101 in association with work identifiers used to identify the workflows. Note that a workflow indicates information that defines processes (printing, reading, registration, etc.) to be executed by the MFP 101 by ordering them. The workflow may include contents (works) to be operated by the user using the MFP 101. The user registers a workflow regarding evidenced document registration processing in the work management server 102, and instructs the work management server 102 to designate or start the workflow using the client 105. The authentication server 103 holds user identifiers (user IDs) and passwords used to identify users as authentication information. The authentication server 103 executes user authentication processing by collating the user ID and password in response to a request from the MFP 101, and transmits information associated with a success/failure of authentication to the MFP 101.

Principal functions of respective units of the MFP 101 will be described below. The MFP 101 includes a CPU, ROM, HDD, and RAM, and the CPU controls processes to be described hereinafter when it loads and executes programs stored in the ROM and HDD.

A print control unit 113 generates print data including an evidenced document identifier used to identify an evidenced document. Furthermore, the print control unit 113 transmits the print data to a printer unit 116, and controls print processing for a board as a printing material to which an evidenced document is to be attached.

A scanner unit 117 digitizes a document read from an original, and generates image data. A scan control unit 114 specifies an evidenced document identifier printed on a board from image data generated by the scan processing of the board attached with an evidenced document using the scanner unit 117, and extracts image data of the attached evidenced document (to be referred to as an "image of an evidenced document" hereinafter). Note that the evidenced document identifier corresponds to a document identifier used to identify a document read by the scanner unit 117. The evidenced document identifier indicates a unique number assigned to each evidenced document. Note that the aforementioned work identifier and user identifier similarly indicate numbers uniquely assigned to a workflow and user, respectively. Note that a number indicates a numeric string, but it may include letters such as alphabets other than numerals.

A UI unit 118 displays a message for the user based on information received from a UI control unit 115, and accepts an instruction from the user. On the other hand, the UI control unit 115 generates and transmits information that can be processed by the UI unit 118, and processes information received from the UI unit 118.

An authentication control unit 111 controls authentication processing of the user who operates the MFP 101. The authentication control unit 111 transmits a user ID and password input to the MFP 101 via the UI unit 118 to the authentication server 103 to control it to execute the authentication processing.

A work information control unit 112 checks whether or not to register an acquired image of an evidenced document in the data management server 104. If the image of the evidenced document is to be registered, the work information control unit 112 performs control required to transmit and register the image of the evidenced document and an evidenced document identifier associated with that image to the data management server 104.

Figures 2, 3, 4:
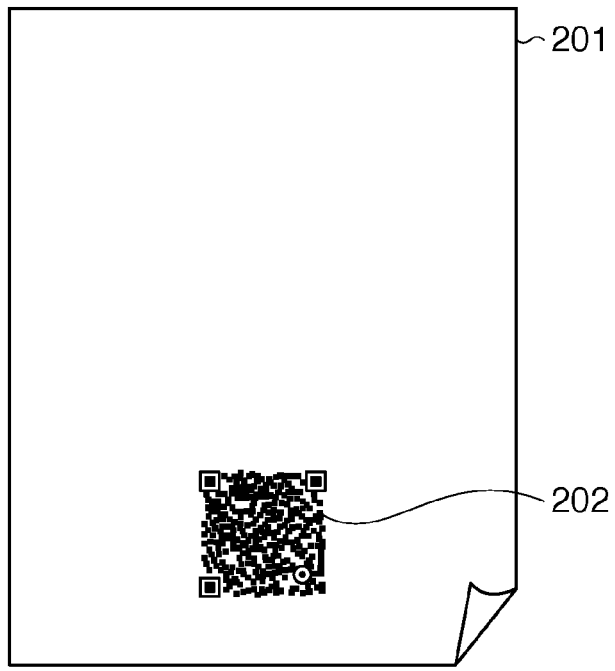
FIG. 2 is a view showing a print example of a board by a multi-function peripheral (MFP) in the image processing system according to the first embodiment.
FIG. 3 is a table showing examples of information managed by a work management server, and saving paths on a storage device upon saving images of evidenced documents linked with evidenced document identifiers in a data management server in the image processing system according to the first embodiment.
FIG. 4 is a table showing examples of authentication information held by an authentication server.

FIG. 2 is a view showing a print example of a board by the MFP 101 in the image processing system 100 according to the first embodiment. Note that FIG. 2 exemplifies a case in which an evidenced document identifier is expressed by a two-dimensional code 202 and is printed on a board 201. The user attaches an evidenced document to the board on which the two-dimensional code indicating the evidenced document identifier is printed, and instructs the MFP 101 to execute scan processing of the board and evidenced document at the same time. Then, the MFP 101 specifies the evidenced document identifier, and generates an image of an evidenced document to be registered in the data management server 104.

FIG. 3 is a table showing examples of information managed by the work management server 102, and saving paths on the storage device upon saving images of evidenced documents linked with evidenced document identifiers in the data management server 104 in the image processing system 100 according to the first embodiment. The work management server 102 manages work identifiers 301, user IDs 302, and evidenced document identifiers 303 in association with each other, as shown in FIG. 3. When an image of an evidenced document is registered from the MFP 101 to the data management server 104, an evidenced document identifier 303 is saved in a saving destination 304 on the storage device in association with the image of the evidenced document.

FIG. 4 is a table showing examples of authentication information held by the authentication server 103. The authentication server 103 manages user IDs 401 and passwords 402 in association with each other, as shown in FIG. 4, in correspondence with the user IDs 302 shown in FIG. 3.

<Processing Sequence of Evidenced Document Registration Operation>

Figure 7:
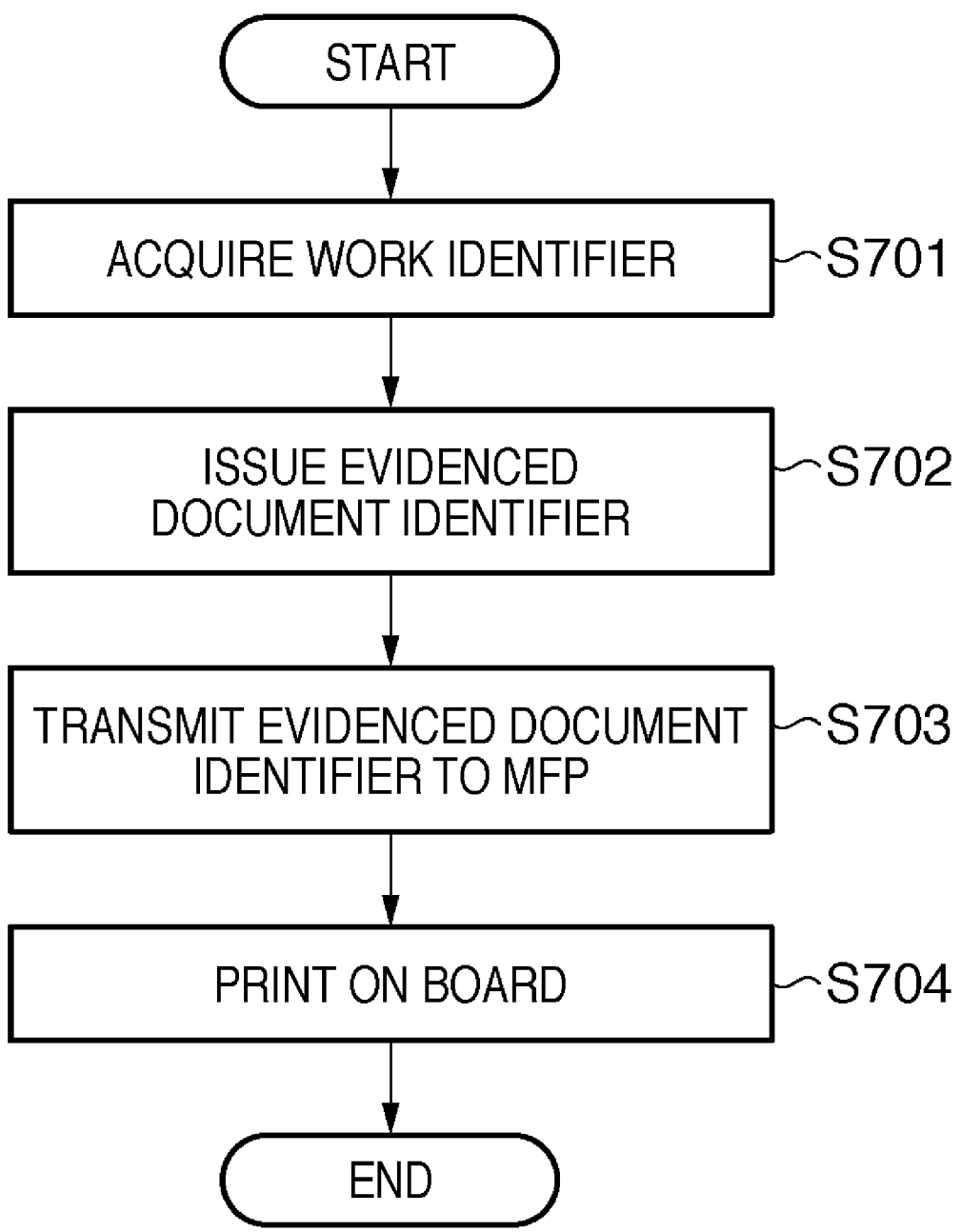
FIG. 7 is a flowchart showing the processing sequence executed when the MFP prints information on a board based on an instruction from the work management server in the image processing system according to the first embodiment.

The evidenced document registration processing in the image processing system 100 according to the first embodiment will be described below. FIG. 7 is a flowchart showing the processing sequence executed when the MFP 101 prints information on a board based on an instruction from the work management server 102 in the image processing system 100 according to the first embodiment.

The user registers a workflow regarding evidenced document registration processing in the work management server 102. Upon starting the evidenced document registration processing, the user designates a work identifier associated with that workflow from the client 105 to the work management server 102.

In step S701, the work management server 102 acquires the work identifier from the client 105. Then, the work management server 102 starts the workflow regarding the evidenced document registration processing, and the process advances to step S702.

In step S702, the work management server 102 issues a new evidenced document identifier corresponding to the received work identifier, and manages the evidenced document identifier in association with the user ID and work identifier. The process then advances to step S703.

In step S703, the work management server 102 transmits the issued evidenced document identifier to the MFP 101 so as to issue a work instruction to print the evidenced document identifier on a board in the MFP 101. After that, the process advances to step S704.

In step S704, the MFP 101 controls the print control unit 113 to generate print data based on the received evidenced document identifier, and controls the printer unit 116 to execute print processing on a board. With the above processes, the MFP 101 completes the print processing on the board.

Figure 8:
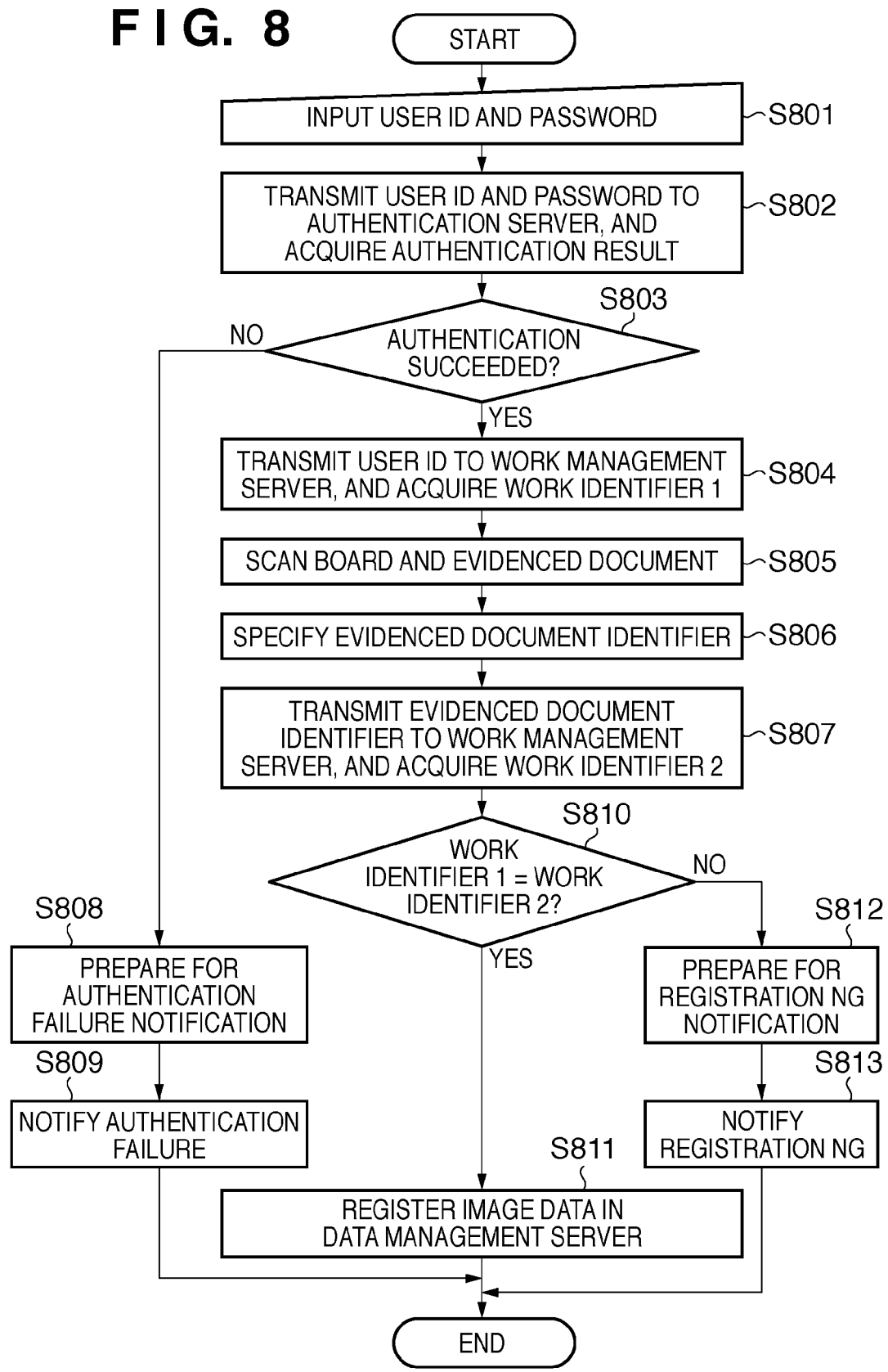
FIG. 8 is a flowchart showing the processing sequence executed when the MFP registers an evidenced document in the data management server in the image processing system according to the first embodiment.

FIG. 8 is a flowchart showing the processing sequence executed when the MFP 101 registers an evidenced document in the data management server 104 in the image processing system 100 according to the first embodiment.

In step S801, the MFP 101 accepts a user ID and password input from the user. Then, the user inputs the user ID and password via the UI unit 118 of the MFP 101. After that, the process advances to step S802.

In step S802, the MFP 101 transmits the acquired user ID and password to the authentication server 103 to make the authentication server 103 execute user authentication processing. The process then advances to step S803.

In step S803, the MFP 101 controls the authentication control unit 111 to determine based on information received from the authentication server 103 whether or not the user authentication has succeeded. If the user authentication has failed, the process jumps to step S808, and the MFP 101 generates a message used to notify the user that the authentication has failed. Furthermore, in step S809, the MPU 101 displays that message on the UI unit 118, thus ending the registration processing. Note that FIG. 12 shows a display example on the UI unit 118 when the user authentication has failed. On the other hand, if the user authentication has succeeded in step S803, the process advances to step S804.

In step S804, the MFP 101 transmits the user ID to the work management server 102. Furthermore, the MFP 101 acquires a work identifier (to be referred to as a "first work identifier" hereinafter) associated with that user ID from the work management server 102, and the process advances to step S805. Note that the process in step S804 corresponds to that by a first acquisition unit. Note that taking FIGS. 3 and 4 as an example, when the user authentication has succeeded based on a user ID "A" and password "aaa", the MFP 101 transmits the user ID "A" to the work management server 102. Furthermore, the MFP 101 acquires a work identifier "WF001" associated with the user ID "A" from the work management server 102.

In step S805, the MFP 101 controls the scanner unit 117 to execute scan processing of a board and evidenced document while the evidenced document to be registered is attached to the board on which the evidenced document identifier is printed. Then, the MFP 101 acquires image data by digitizing the board and evidenced document. In step S806, the MFP 101 controls the scan control unit 114 to specify the evidenced document identifier and to extract an image of the evidenced document from the image data.

After that, in step S807, the MFP 101 transmits the specified evidenced document identifier to the work management server 102. Also, the MFP 101 acquires a work identifier (to be referred to as a "second work identifier" hereinafter) associated with that evidenced document identifier from the work management server 102, and the process then advances to step S810. Note that the process in step S807 corresponds to that by a second acquisition unit. Note that taking FIG. 3 as an example, when the specified evidenced document identifier is "001", the MFP 101 acquires a work identifier "WF001" associated with that identifier.

The MFP 101 determines in step S810 if the first and second work identifiers match. If the two work identifiers do not match, the process advances to step S812. In step S812, the MFP 101 generates a message used to notify that registration of the evidenced document is NG. Furthermore, in step S813, the MFP 101 displays that message on the UI unit 118, thus ending the processing. Note that FIG. 14 shows a display example on the UI unit 118 when the work identifiers do not match. On the other hand, if it is determined in step S810 that the first and second work identifiers match, the process advances to step S811.

In step S811, the MFP 101 transmits the image of the evidenced document to the data management server 104 and registers it. With the above processes, the evidenced document registration processing from the MFP 101 to the data management server 104 is complete.

As described above, when the user registers an evidenced document as image data in the server in the image processing system according to this embodiment, the MFP decides whether or not to register the evidenced document not only by the authentication processing based on the user ID and password but also by the determination processing based on the work identifier used to identify the workflow. More specifically, when the work identifier associated with the user ID matches that associated with the evidenced document identifier corresponding to the evidenced document to be registered, the MFP executes registration processing. As a result, an effect of suppressing evidenced document registration by spoofing of a third party can be enhanced.

Second Embodiment

The second embodiment of the present invention will be described below with reference to FIG. 9. Note that only a technique different from the first embodiment will be explained below. This embodiment is characterized in that, in determination processing upon checking whether or not to register an evidenced document, when a work identifier associated with a user ID does not match that associated with an evidenced document identifier corresponding to an evidenced document to be registered, confirmation processing as to whether or not to proceed with registration processing is performed for the user who has the user ID associated with the evidenced document identifier.

Figure 9:
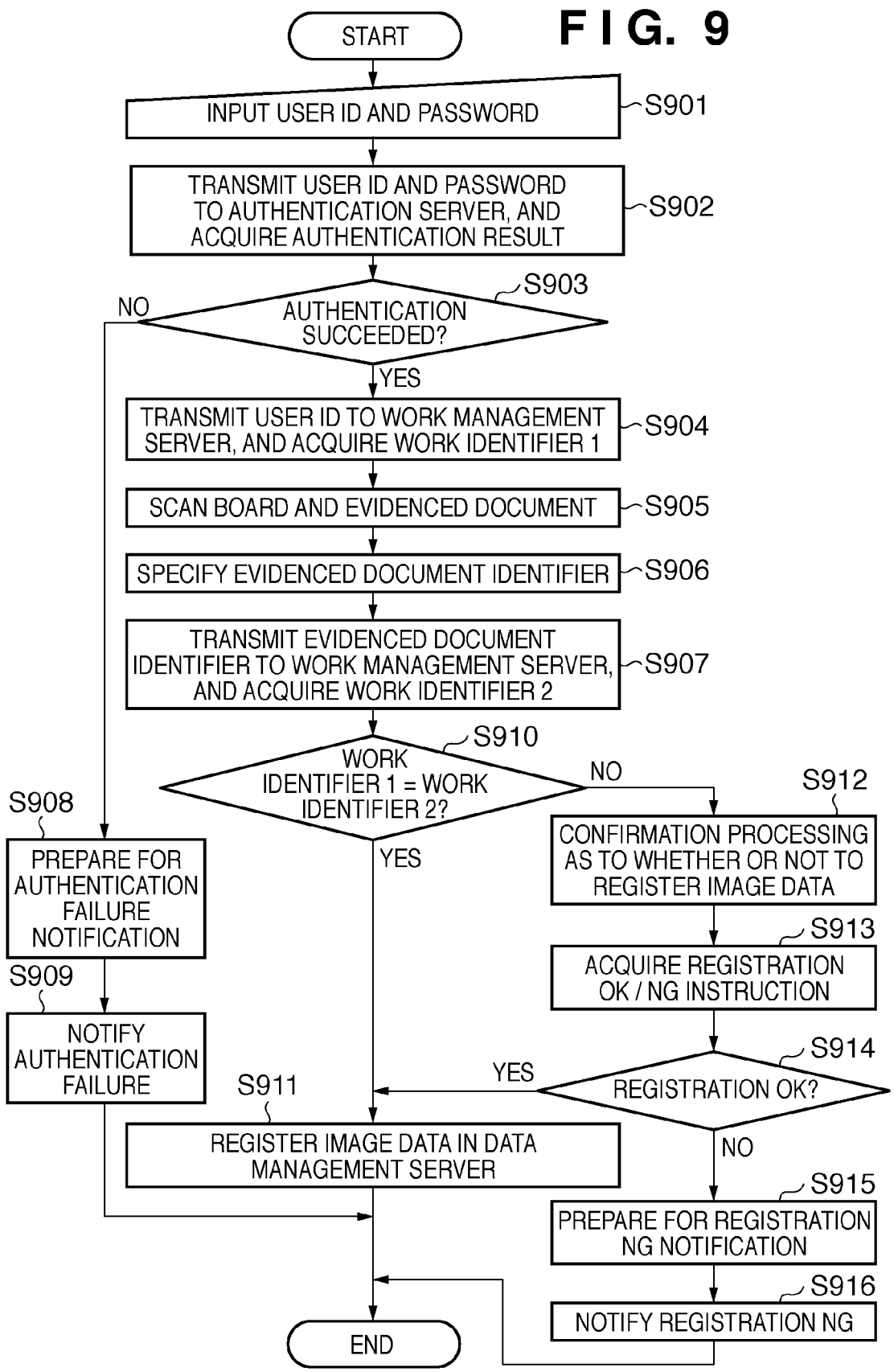
FIG. 9 is a flowchart showing the processing sequence executed when an MFP registers an evidenced document in a data management server in an image processing system according to the second embodiment.

FIG. 9 is a flowchart showing the processing sequence executed when an MFP 101 registers an evidenced document in a data management server 104 in an image processing system 100 according to the second embodiment. Since steps S901 to S909 in FIG. 9 are the same as steps S801 to S809 in FIG. 8 of the first embodiment, a description thereof will not be repeated, and only steps according to this embodiment will be described.

The MFP 101 determines in step S910 if first and second work identifiers match. If the two work identifiers match, the process advances to step S911. In step S911, the MFP 101 registers an image of an evidenced document in the data management server 104, thus ending the processing.

On the other hand, if the first and second work identifiers do not match in step S910, the process advances to step S912. Taking FIGS. 3 and 4 as an example, assume that the MFP 101 has succeeded user authentication of a user ID "A" in steps S904 and S905, and acquires "WF001" as the first work identifier. At this time, when the MFP 101 recognizes an evidenced document identifier "002" and acquires "WF002" as the second work identifier in steps S906 and S907, the work identifiers do not match.

In step S912, the MFP 101 performs confirmation processing as to whether or not to register an image of an evidenced document in the data management server 104 for the user who has the user ID associated with the evidenced document identifier. As this confirmation processing, the MFP 101 creates an e-mail message including a character string associated with the evidenced document identifier and link information associated with the registration processing of an image of an evidenced document, and transmits that e-mail message to a mail address of the user. Note that the user ID associated with the evidenced document identifier may be acquired together when the MFP 101 acquires the work identifier associated with the evidenced document identifier in step S907.

In step S913, the MFP 101 waits until it acquires a registration OK/NG instruction about the image of the evidenced document from the user. If the MFP 101 acquires the instruction, the process advances to step S914.

The MFP 101 determines in step S914 based on the received instruction whether or not to register the image of the evidenced document in the data management server 104. If it is determined that the image of the evidenced document is to be registered, the process advances to step S911 to execute the registration processing. On the other hand, if it is determined that the image of the evidenced document is not to be registered, the process advances to step S915.

In step S915, the MFP 101 generates a message used to notify that registration of the image of the evidenced document is NG. Furthermore, in step S916, the MFP 101 displays that message on the UI unit 118, thus ending the processing.

As described above, in determination processing executed upon checking whether or not to register an evidenced document in the image processing system according to this embodiment, when a work identifier associated with a user ID does not match that associated with an evidenced document identifier corresponding to an evidenced document to be registered, the MFP performs confirmation processing as to whether or not to proceed with registration processing for the user who has the user ID associated with the evidenced document identifier. Then, an effect of suppressing evidenced document registration by spoofing of a third party can be enhanced, and the convenience at the time of evidenced document registration can be improved.

Third Embodiment

The third embodiment of the present invention will be described below with reference to FIGS. 5, 6, 10, and 11. This embodiment is characterized in that a password of a user is printed in addition to an evidenced document identifier upon printing information on a board.

Figures 5, 6:
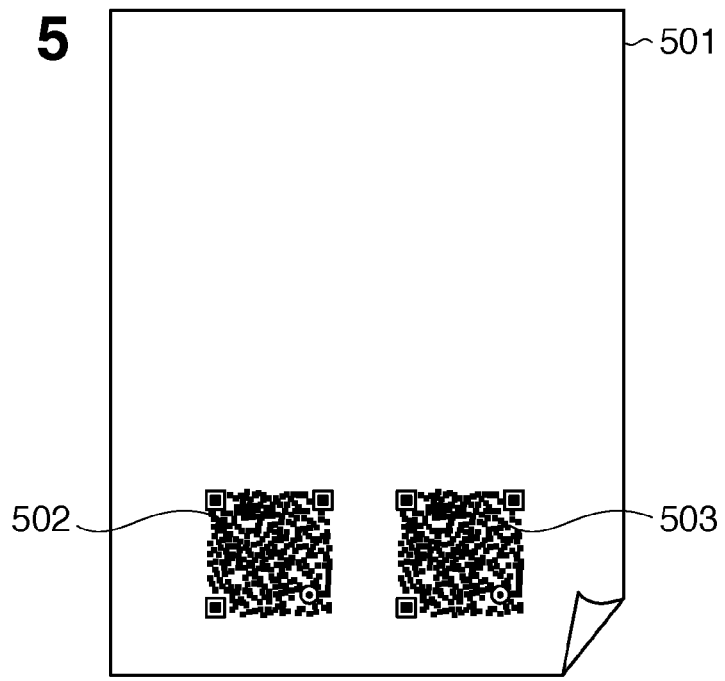
FIG. 5 is a view showing a print example of a board by an MFP in an image processing system according to the third embodiment.
FIG. 6 is a table showing examples of information managed by a work management server, and saving paths on a storage device upon saving images of evidenced documents linked with evidenced document identifiers in a data management server in the image processing system according to the third embodiment.

FIG. 5 is a view showing a print example of a broad by an MFP 101 in an image processing system 100 according to the third embodiment. FIG. 5 exemplifies a case in which a password of the user is expressed by a two-dimensional code 503 which is printed on a board 501 in addition to a two-dimensional code 502 which expresses an evidenced document identifier. Note that the password may be converted into information which makes decoding difficult. The user attaches an evidenced document to that board to execute scan processing using the MFP 101, thus controlling the MFP 101 to specify not only the evidenced document identifier but also the password of the user.

FIG. 6 is a table showing examples of information managed by a work management server 102, and saving paths on a storage device upon saving images of evidenced documents associated with evidenced document identifiers in a data management server 104 in the image processing system 100 according to the third embodiment. As shown in FIG. 6, the work management server 102 manages contents 602 of workflows to be executed by the MFP 101 in association with work identifiers 601, user IDs 603, and evidenced document identifiers 604.

Figure 10:
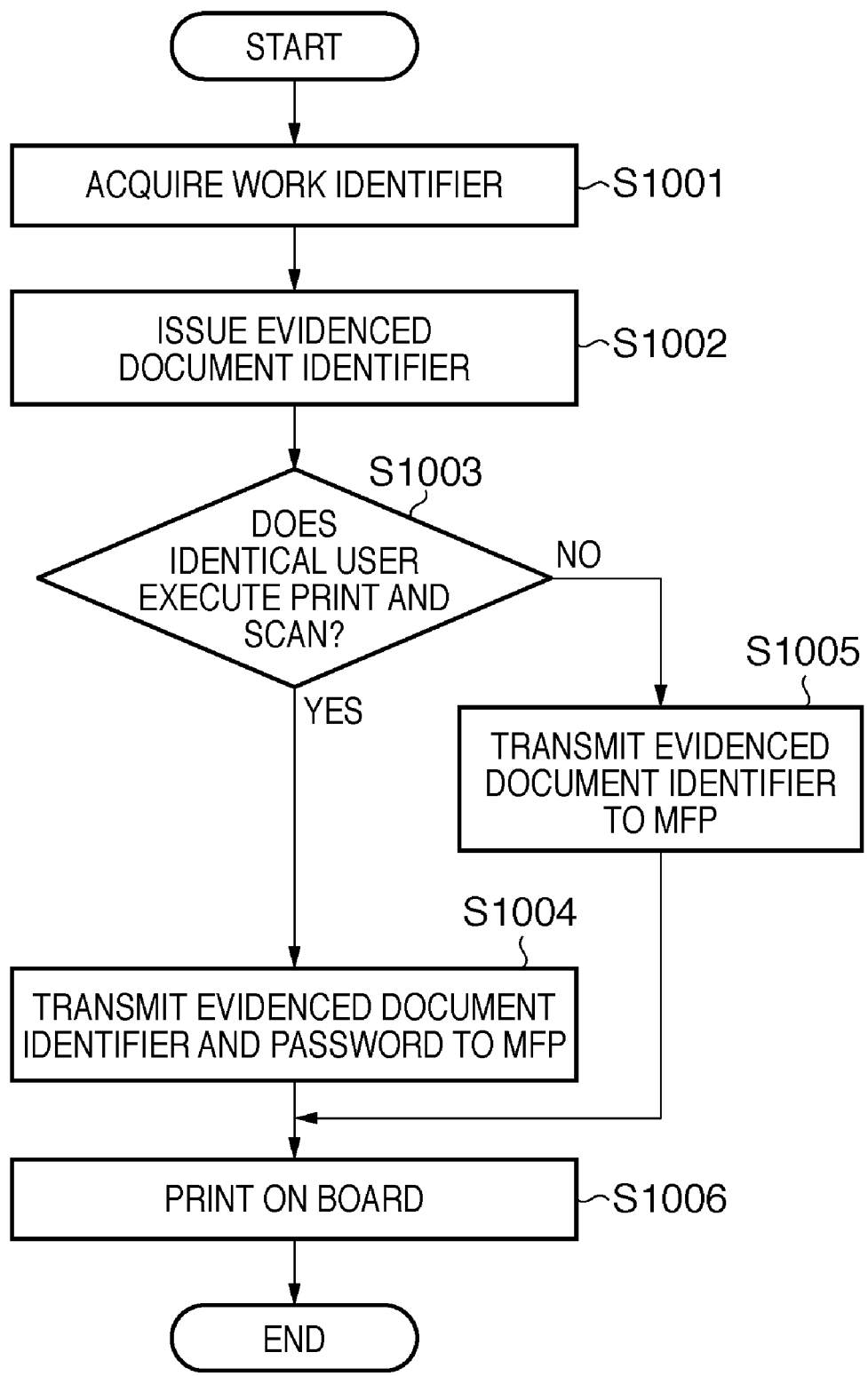
FIG. 10 is a flowchart showing the processing sequence executed when the MFP prints information on a board based on an instruction from the work management server in the image processing system according to the third embodiment.

FIG. 10 is a flowchart showing the processing sequence executed when the MFP 101 prints information on a board based on information from the work management server 102 in the image processing system 100 according to the third embodiment. Note that since steps S1001 and S1002 in FIG. 10 are the same as steps S701 and S702 in FIG. 7 of the first embodiment, a detailed description thereof will not be repeated, and only steps unique to this embodiment will be explained.

The work management server 102 determines in step S1003 whether or not scan processing of a board and evidenced document and registration processing of an image of the evidenced document are successively executed by the identical user after print processing on the board as a workflow in the MFP 101. In this case, for example, when "print" and "scan & registration" are successively defined as the contents of a workflow associated with an identical user ID "A" in the work management server 102, as shown in FIG. 6, it is determined that both the works are successively done by the identical user. In this case, the process advances to step S1004.

In step S1004, the work management server 102 acquires a password corresponding to the user ID of the user who executes print processing on a board from an authentication server 103. Furthermore, the work management server 102 transmits the evidenced document identifier and password to the MFP 101 so as to issue a work instruction to print the evidenced document identifier and password on the board in the MFP 101. After that, the process advances to step S1006.

On the other hand, if it is determined in step S1003 that both the works are not successively executed by the identical user, the process advances to step S1005. In step S1005, the work management server 102 transmits the issued evidenced document identifier to the MFP 101. After that, the process advances to step S1006.

In step S1006, the MFP 101 controls a print control unit 113 to generate print data based on the received evidenced document identifier and password, and controls the printer unit 116 to execute print processing on a board. Note that upon reception of the evidenced document identifier alone, the MFP 101 prints only the evidenced document identifier on the board. With the above processes, the MFP 101 completes the print processing on the board.

Figure 11:
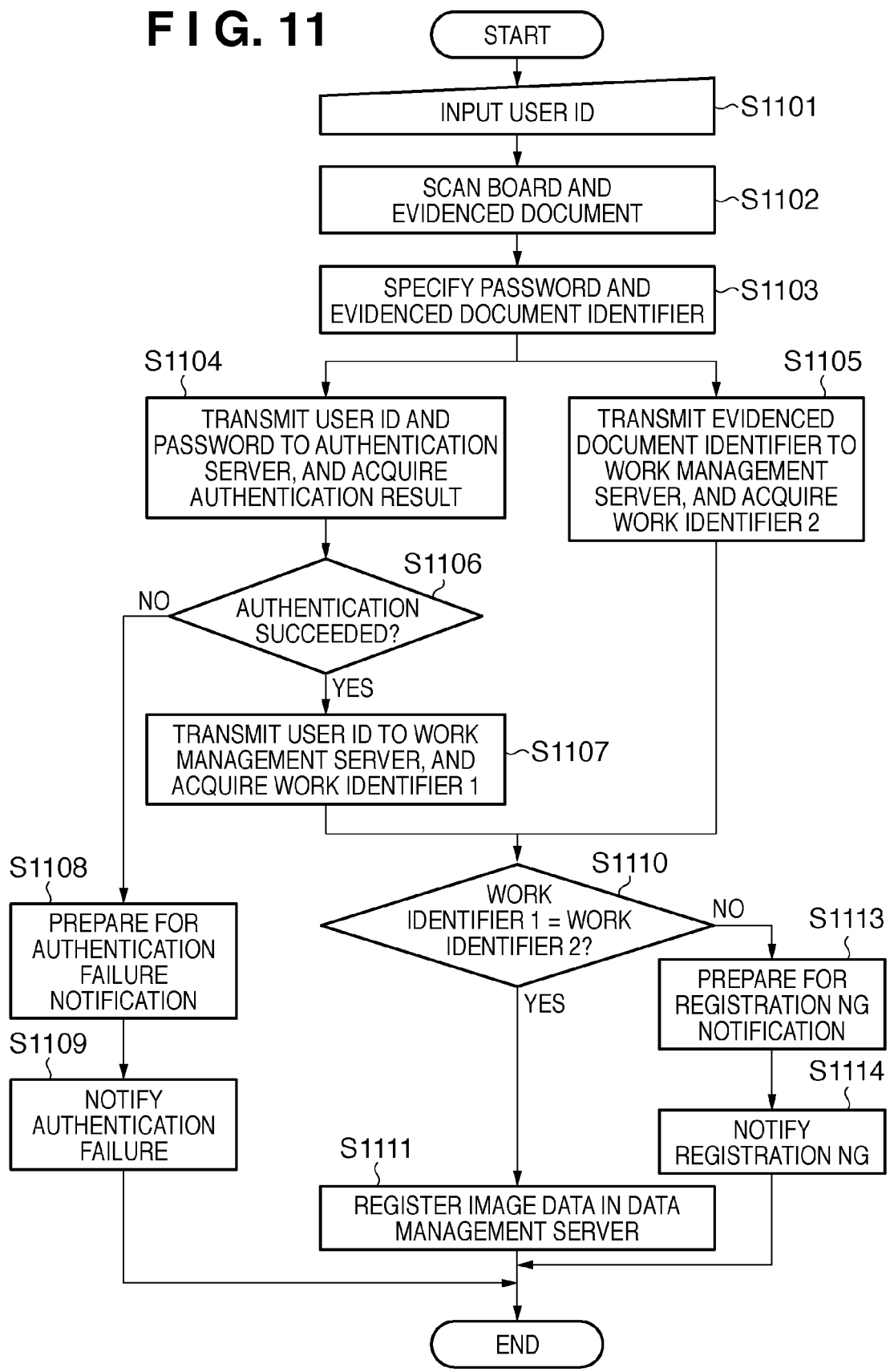
FIG. 11 is a flowchart showing the processing sequence executed when the MFP registers an evidenced document in the data management server in the image processing system according to the third embodiment.

FIG. 11 is a flowchart showing the processing sequence executed when the MFP 101 registers an evidenced document in the data management server 104 in the image processing system 100 according to the third embodiment. FIG. 11 shows a case in which both an evidenced document identifier and password are printed on a board. Note that when an evidenced document identifier alone is printed on a board, evidenced document registration processing is executed in the processing sequence shown in FIG. 8 of the first embodiment.

In step S1101, the MFP 101 accepts a user ID alone input from the user. Then, the user inputs a user ID using a UI unit 118 of the MFP 101. After that, the process advances to step S1102.

In step S1102, the MFP 101 controls a scanner unit 117 to execute scan processing of a board and evidenced document while the evidenced document to be registered is attached to the board on which the evidenced document identifier and password are printed. Then, the MFP 101 acquires image data by digitizing the board and evidenced document. Furthermore, in step S1103, the MFP 101 controls a scan control unit 114 to specify the evidenced document identifier and password, and to extract an image of the evidenced document from the image data. After that, the process advances to steps S1104 and S1105, which are to be executed at the same time.

In step S1104, the MFP 101 transmits the acquired user ID and password to the authentication server 103 so as to execute the user authentication processing. The process then advances to step S1106.

The authentication control unit 111 in the MFP 101 determines in step S1106 based on information received from the authentication server 103 whether or not user authentication has succeeded. If the user authentication has failed, the process jumps to step S1108, and the MFP 101 generates a message used to notify the user that the authentication has failed. Note that FIG. 13 shows a display example on the UI unit 118 when the user authentication has failed. Furthermore, in step S1109, the MFP 101 displays that message on the UI unit 118, thus ending the registration processing. On the other hand, if the user authentication has succeeded in step S1106, the process advances to step S1107.

In step S1107, the MFP 101 transmits the user ID to the work management server 102. Furthermore, the MFP 101 acquires a first work identifier associated with the user ID from the work management server 102. The process then advances to step S1110.

Parallel to steps S1104 to S1107, the MFP 101 acquires a second work identifier that is linked with the evidenced document identifier from the work management server 102 in step S1105. After this, the process advances to step S1110.

Since steps S1110 to S1113 mirror steps S810 to S813 in FIG. 8 of the first embodiment, a description thereof will not be repeated.

As described above, in the image processing system according to this embodiment, the MFP prints not only an evidenced document identifier but also a password of the user on a board. Then, upon execution of the scan processing of the board attached with an evidenced document, the password is also specified from the board. Hence, the user need not input a password to the MFP, thus improving the convenience at the time of evidenced document registration.

Note that the present invention is not limited to the aforementioned embodiments and various modifications can be made. For example, the present invention may be practiced by combining the second and third embodiments. That is, the confirmation processing for the user described in the second embodiment may be added to the third embodiment. Thus, the effects in the two embodiments can be received.

Furthermore, the present invention allows various other modifications. For example, the MFP 101 may execute some or all of the processes to be executed by the work management server 102. That is, the MFP 101 may manage work identifiers managed by the work management server 102. On the other hand, the work management server 102 may execute some processes to be executed by the MFP 101. More specifically, the work management server 102 may execute processing for determining whether or not the first and second work identifiers match (for example, S810). In this case, the MFP 101 need not execute processing for acquiring a work identifier corresponding to the user ID from the work management server 102 and processing for acquiring a work identifier corresponding to the evidenced document identifier from the work management server 102.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-065218, filed Mar. 17, 2009, which is hereby incorporated by reference herein in its entirety.

What is claimed is:

1. An image processing system that comprises an image processing apparatus and a work management apparatus,
    said work management apparatus comprising
        a management unit that manages a document identifier used to identify a document and a user identifier used to identify a user in association with each other; and
    said image processing apparatus comprising
        a reading unit that reads a document to generate digital data,
        a first specifying unit that specifies a document identifier of the document read by said reading unit,
        an authentication unit that authenticates a user,
        a second specifying unit that specifies a user identifier of the user authenticated by said authentication unit, and
        a registration unit that registers the digital data generated by said reading unit, when said management unit manages the document identifier specified by said first specifying unit and the user identifier specified by said second specifying unit in association with each other.

2. The system according to claim 1, wherein the user identifier and the document identifier managed by said management unit are managed in association with a work identifier used to identify a work required to register digital data of a document to be registered.

3. The system according to claim 2, further comprising:
    a printing unit that prints the document identifier, which is managed by said management unit in association with a work identifier designated by a user, on a printing material in response to a user's designation of the work identifier used to identify the work required to register digital data of a document to be registered.

4. The system according to claim 3, wherein said reading unit reads the printing material printed by said printing unit, and
    said first specifying unit specifies the document identifier of the document read by said reading unit from the printing material read by said reading unit.

5. The system according to claim 1, further comprising:
    a confirmation unit that confirms, when said management unit does not manage the document identifier specified by said first specifying unit and the user identifier specified by said second specifying unit in association with each other, whether or not to register the digital data generated by said reading unit for a user having the user identifier specified by said second specifying unit,
    wherein said registration unit registers the digital data generated by said reading unit when said confirmation unit confirms that the digital data of the document to be registered is registered.

6. The system according to claim 5, wherein said confirmation unit confirms, using an e-mail message, whether or not to register the digital data of the document to be registered for the user having the user identifier specified by said second specifying unit.

7. The system according to claim 1, wherein said authentication unit authenticates the user based on a user identifier and a password input by the user.

8. The system according to claim 1, wherein said work management apparatus and said image processing apparatus are configured to be connected to be able to communicate with each other via a network.

9. The system according to claim 1, wherein said image processing system further comprises a data management apparatus that stores digital data of a document to be registered, and
    said registration unit registers the digital data of the document read by said reading unit in said data registration apparatus.

10. An image processing system that comprises a work management apparatus and an image processing apparatus,
    said image processing apparatus comprising
        a reading unit that reads a document to generate digital data,
        a first specifying unit that specifies a document identifier of the document read by said reading unit,
        a first transmission unit that transmits the document identifier specified by said first specifying unit to said work management apparatus,
        an authentication unit that authenticates a user,
        a second specifying unit that specifies a user identifier of the user authenticated by said authentication unit, and
        a second transmission unit that transmits the user identifier specified by said second specifying unit to said work management apparatus; and
    said work management apparatus comprising
        a management unit that manages a document identifier used to identify a document and a user identifier used to identify a user in association with each other,
        a first reception unit that receives the document identifier transmitted by said first transmission unit,
        a second reception unit that receives the user identifier transmitted by said second transmission unit, and
        a registration unit that registers the digital data generated by said reading unit when said management unit manages the document identifier received by said first reception unit and the user identifier received by said second reception unit in association with each other.

11. An image processing apparatus comprising:
    a management unit that manages a document identifier used to identify a document and a user identifier used to identify a user in association with each other;
    a reading unit that reads a document to generate digital data;
    a first specifying unit that specifies a document identifier of a document read by said reading unit;
    an authentication unit that authenticates a user;
    a second specifying unit that specifies a user identifier of the user authenticated by said authentication unit; and
    a registration unit that registers the digital data generated by said reading unit when said management unit manages the document identifier specified by said first specifying unit and the user identifier specified by said second specifying unit in association with each other.

12. A method of controlling an image processing system that comprises a work management apparatus and an image processing apparatus, the method comprising causing the work management apparatus to manage a document identifier used to identify a document and a user identifier used to identify a user in association with each other; and causing the image processing apparatus to read a document to generate digital data, specify a document identifier of the document read in the reading, authenticate a user, specify a user identifier of the user authenticated the authenticating, and register the digital data generated in the reading, when the document identifier specified in the specifying the document identifier and the user identifier specified in the specifying the user identifier are managed in association with each other in the managing.

* * * * *